United States Patent

La Raus

[15] 3,699,776
[45] Oct. 24, 1972

[54] OZONE PURIFIER FOR PRESSURIZED WATER COOLER

[72] Inventor: Julius La Raus, Rochester, N.Y.

[73] Assignee: Moody Aquamatic Systems, Inc., Meadville, Pa.

[22] Filed: June 30, 1971

[21] Appl. No.: 158,377

[52] U.S. Cl. ..................62/157, 62/201, 62/264, 62/331, 62/394, 210/192
[51] Int. Cl. ............................................F25d 23/00
[58] Field of Search........62/264, 157, 180, 201, 394, 62/395, 78, 331; 210/63, 192

[56] References Cited

UNITED STATES PATENTS

| | | | |
|---|---|---|---|
| 1,190,769 | 7/1916 | Jurist | 62/264 |
| 2,009,230 | 7/1935 | Hartman | 210/63 |
| 2,623,367 | 12/1952 | Morrison | 62/264 |
| 2,660,559 | 11/1953 | Prime | 210/63 |

*Primary Examiner*—Meyer Perlin
*Attorney*—Shlesinger, Fitzsimmons & Shlesinger

[57] ABSTRACT

Drinking water under pressure is fed automatically, when necessary, through a float valve into a sealed contact tank, which has an air space in its upper end. An electrically controlled ozone generator has its output connected to a diffuser that is mounted in the lower end of the tank; and a pressure regulator is mounted in the top of the tank to vent its air space when the pressure therein rises above, for example, five pounds per square inch. The tank itself may be surrounded by a cooling coil, so as to function both as a contact and cooling tank, or its output may be connected to a second tank surrounded by a cooling coil. The ozone generator may be periodically energized by a timer, or by a thermostat which is responsive to the temperature of the water in the cooling tank.

9 Claims, 4 Drawing Figures

PATENTED OCT 24 1972
3,699,776
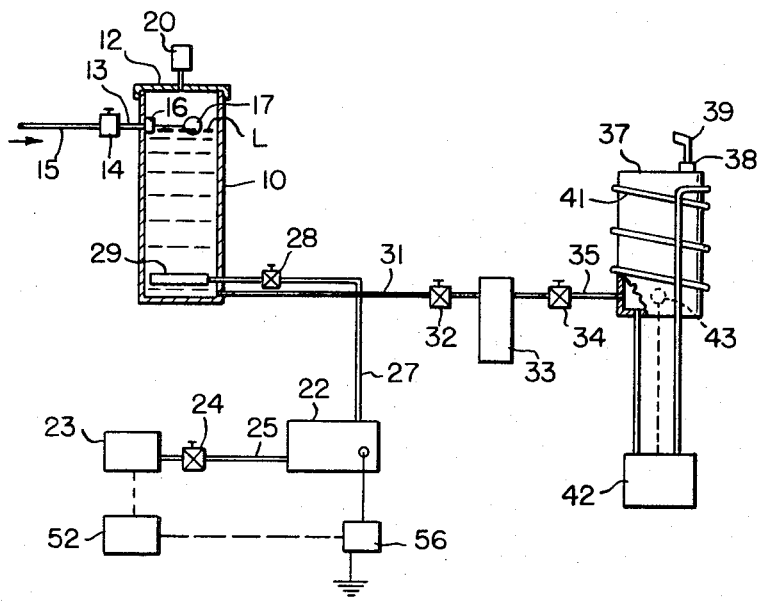
FIG. 1
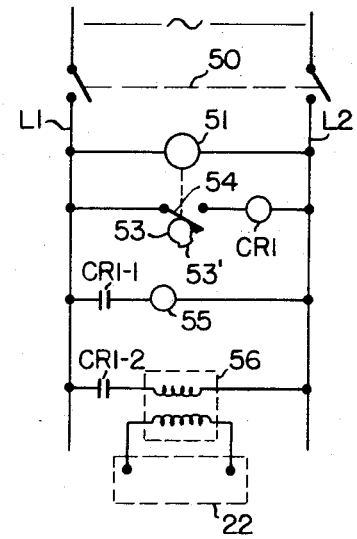
FIG. 2
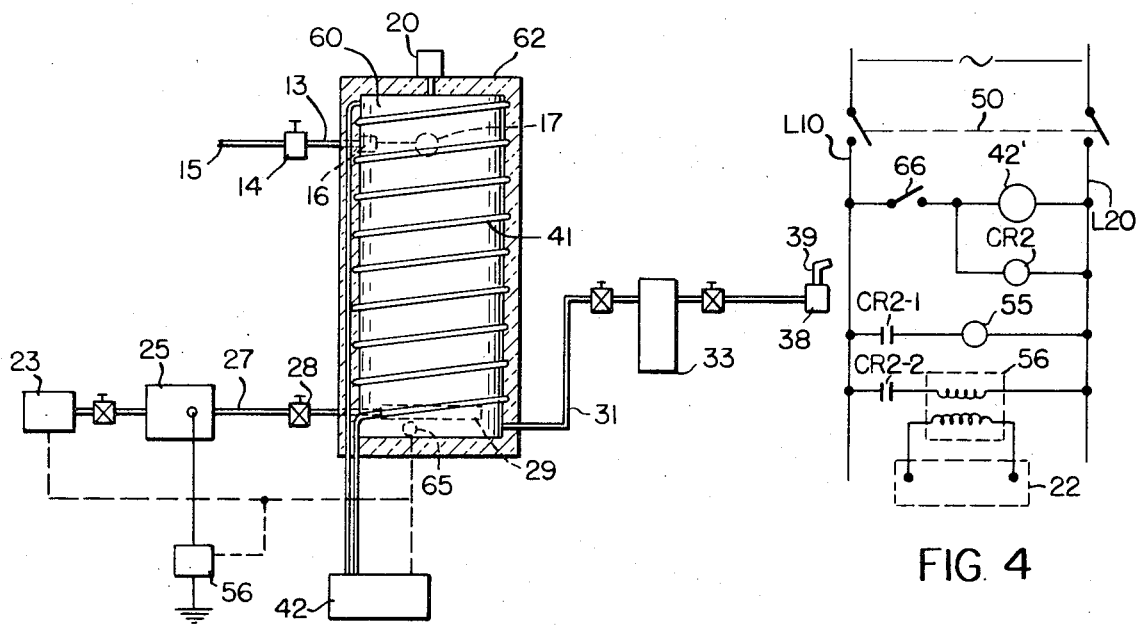
FIG. 3
FIG. 4
INVENTOR.
Julius LaRaus
BY
Shlesinger, Fitzsimmons & Shlesinger
ATTORNEYS

OZONE PURIFIER FOR PRESSURIZED WATER COOLER

This invention relates to drinking water coolers, and more particularly to a pressurized drinking water cooler having an ozone purification device attached to its water supply to remove noxious odors, tastes, and the like, from the water before its discharge from the cooler.

Heretofore various devices have been developed for adding ozone gas to drinking water to help purify the water by removing therefrom any noxious odors and/or tastes caused by, for example, high concentrations of sulphur or chlorine in the water. Most such prior devices, however, have not been suitable for use in conjunction with drinking water coolers, which require a predetermined system pressure in order to permit water to be dispensed satisfactorily from the cooler.

It is an object of this invention to provide improved apparatus for ozonating the supply of water for a drinking water cooler to remove undesirable odors and tastes from the water before it is dispensed from the cooler.

Another object of this invention is to provide a novel, pressurized drinking water system capable of automatically and periodically ozonating a supply of drinking water for a cooler of the type described.

A further object of this invention is to provide an improved drinking water cooler, which contains means for periodically supplying ozone gas to the water in the cooler to effect purification thereof.

Other objects of the invention will be apparent hereinafter from the specification and from the recital of the appended claims, particularly when read in conjunction with the accompanying drawing.

In the drawing:

FIG. 1 is a schematic view illustrating a drinking water cooler and ozone water purification apparatus therefor made in accordance with one embodiment of this invention;

FIG. 2 is a wiring diagram illustrating one manner in which the apparatus of FIG. 1 may be wired to operate;

FIG. 3 is a schematic view of a modified water cooler and ozonating apparatus therefor made in accordance with another embodiment of this invention; and FIG. 4 is a wiring diagram illustrating one manner in which the apparatus in FIG. 3 may be wired for operation.

Referring now to the drawing by numerals of reference, and first to the embodiment of FIGS. 1 and 2, 10 denotes a sealed contact tank, which is closed at its upper end by a cover 12. Adjacent its upper end tank 10 is connected to an inlet pipe 13, one end of which opens on the interior of the tank at a point axially spaced beneath the cover 12. At its opposite end pipe 13 is connected through a conventional pressure regulator 14 and a supply pipe 15 to a pressurized drinking water supply. A conventional float-operated valve 16 is connected to pipe 13 in the tank 10 to control the admission of drinking water to the tank from the supply line 15. The operating arm for valve 16 carries a float 17, which maintains the valve 16 closed, when the water in tank 10 has reached a predetermined level L, as illustrated in FIG. 1.

When the contact tank 10 is filled to its maximum level L, an air space remains in the tank 10 beneath its cover 12 and the upper surface of the water in the tank. The pressure of the air in this space is controlled by a conventional air pressure regulator 20, which is mounted on cover 12 to communicate with the tank interior.

Mounted adjacent the contact tank 10 is a conventional ozone gas generator 22, and an associated air compressor 23. The output of compressor 23 is connected in known manner through a check valve 24 and a pipe 25 to the inlet of the generator 22. The output of the generator is connected by a pipe 27 and check valve 28 to a conventional, perforated diffuser 29, which is mounted in tank 10 adjacent the lower end thereof.

Beneath diffuser 29 tank 10 is connected at its lower end by a pipe 31, a valve 32, a conventional filter unit 33, a further valve 34 and the pipe 35 with the lower end of a water cooler tank or reservoir 37. At its upper end tank 37 has an outlet connected through a conventional, manually operable valve 38 with a spigot or faucet from which pure drinking water is adapted to be dispensed as hereinafter described. Coiled around the outside of tank 37 is a tubular refrigerant line 41, opposite ends of which are connected in the usual manner to a conventional refrigeration unit 42 that is associated with tank 37. In this embodiment, unit 42 is controlled in conventional manner by a thermostat 43 mounted on tank 37 adjacent its lower end, for example.

In use, ozone gas from the generator 22 is adapted to be fed periodically through pipe 27 and check valve 28 to the diffuser 29, where the gas is broken up into tiny bubbles which rise upwardly through the water in the tank 10 to oxidize impurities in the water, such as, for example, excess chlorine and sulphur, thereby removing undesirable odors and tastes from the drinking water before it is delivered to the water cooler 37. It is desired that the pressure of the water in the cooler tank 37 be maintained at a predetermined pressure above atmosphere — for example, 5 pounds per square inch — so that whenever the valve 38 is operated, drinking water under relatively slight pressure will be dispensed from the spigot 39. For this reason the air pressure regulator 20 is set to maintain approximately 5 pounds per square inch pressure in the air that is trapped in the tank 10 beneath cover 12, and above the level of the water in the tank. When the air pressure in tank 10 exceeds this 5 pounds per square inch limit, a safety valve (not illustrated) in regulator 20 opens in known manner to vent the interior of tank 10 until the pressure therein once again falls to, or below, 5 pounds per square inch.

In order to enable ozone gas to be delivered from the generator 22 to the contact tank 10, the air compressor 23 is set to feed air at approximately 10 pounds per square inch to the generator 22, so that the ozone gas delivered from the generator to the diffuser 29 will be at a pressure above 5 pounds per square inch, in order to overcome the back pressure maintained in tank 10 by the regulator 20. Thus, whenever the generator 22 is operating, any excess ozone gas, which enters tank 10 through the diffuser 29, and which is not absorbed by the water in the tank, rises to the air space above the level of the liquid in the tank, increasing the pressure in this space until regulator 20 operates to vent the tank. Any such excess ozone gas, air and/or moisture, which is released upon operation of the safety valve in regulator 20, is piped or otherwise conveyed to the drain line for the water cooler (not illustrated). Since ozone gas may have a deleterious effect on surrounding metal and rubber surfaces, if allowed to escape into the atmosphere around the cooler, it is preferable that a polyvinyl-chloride pipe, or the like be connected at one end to the output of the regulator 20, and at its opposite end to the drain line beyond the drain trap of the associated water cooler, or to an absorption filter suitable to absorb excess ozone and the like.

Referring now to FIG. 2, the electrical control circuit for the apparatus of FIG. 1 may comprise a pair of wires or lines L1 and L2, which may be connected through a conventional ON–OFF switch 50 with an alternating current power supply. Connected between lines L1 and L2 is the drive motor 51 for a conventional timer, which is illustrated schematically at 52 in FIG. 1. The timer motor 51 drives a cam 53, which operates a normally open timer switch 54 that is connected in series with a relay CR1 between lines L1 and L2. Relay CR1 controls a pair of normally open switch contacts CR1–1 and CR1–2. Contact CR1–1 is connected in series with the motor 55, which operates the air compressor 23; and the switch contacts CR1–2 are connected in series with the primary coil of a transformer 56, which supplies high voltage to the generator 22 in known manner.

Whenever the switch 50 is closed, the motor 51 for the timer 52 is energized, and revolves the cam 53 at the rate of, for example, one revolution per fifteen minutes. During each revolution of cam 53 a lobe 53' thereon engages and closes the switch 54 for approximately five minutes, thereby maintaining the relay CR1 energized for the same period of time. When relay CR1 is energized, it closes its contacts CR1–1 and CR1–2, thereby simultaneously energizing the motor 55 for compressor 23, and the transformer 56, which supplies power to the generator 22. During this period of time generator 22 feeds ozone gas through pipe 27 and check valve 28 to the diffuser 29; and, as noted above, the water in the tank 10 is thus ozonated or purified by the ozone gas, and excess gas is exhausted from the tank 10 through the regulator 20. When the cam 53 rotates its lobe 53' from beneath the switch 54, the relay CR1 becomes deenergized, thereby opening its contacts CR1–1 and CR1–2 once again to deenergize the compressor motor 55 and the transformer 56.

Whenever the valve 38 is opened, the pressure in tank 10 causes water in the tank to be fed through the filter 33, and through tank 37 to the spigot 39. As the level of the water in tank 10 falls beneath its upper limit L, the float 17 drops in the usual manner, and causes valve 16 to open to admit water from the supply line 15 until the liquid in tank 10 is returned to its upper level L. The regulator 14 is set so that the pressure of the water entering tank 10 from the line 15 is slightly greater than the five pounds per square inch maximum pressure maintained in the tank 10 by the regulator 20.

The thermostat 43 operates in known manner to energize the refrigeration unit 42 whenever the temperature of the water in tank 37 falls below a predetermined value.

From the foregoing it will be apparent that the apparatus of FIGS. 1 and 2 provides relatively simple, inexpensive and compact means for purifying drinking water by ozonation immediately preceding the feeding of the water to the tank of a pressurized water cooler. In this embodiment, one tank (37) is used for cooling the drinking water, and a separate tank (10) is used for purifying the water by bubbling ozone gas therethrough. Tank 37 need only be large enough to assure that, under normal or average operating conditions, incoming water from the line 35 will remain in the tank 37 long enough to be chilled to a predetermined temperature. The size of tank 10 will be related to the frequency with which the ozone generator 22 is energized by the timer 52. For example, the smaller the tank 10, the more frequent should be the operation of the generator 22, to assure that all water flowing through tank 10 will be adequately exposed to ozone gas from the diffuser 29.

Referring now to the embodiment illustrated in FIGS. 3 and 4, wherein like numerals are employed to denote elements similar to those employed in the first embodiment, a single tank or reservoir is employed both for chilling the drinking water and for exposing it to ozone gas. In this embodiment, 60 denotes a tank or reservoir, which, as in the first embodiment, contains a float operated valve 16 for controlling the supply of water to the tank from the supply line 15. The float 17 for valve 16 is positioned in tank 16 so that an air space will be formed in the tank above the level of the drinking water therein. Also, as in the first embodiment, this air pocket or space in tank 60 is adapted under certain conditions to be vented by an air pressure regulator 20, which is connected to the top of tank 60.

Mounted adjacent tank 60 are an ozone generator 22, and its associated air compressor 23, the output of which is fed to generator 22 as in the first embodiment. Also, the ozone gas developed by generator 22 is fed through a pipe 27 and check valve 28 to a diffuser 29, which is mounted in tank 60 adjacent the lower end thereof. At its lower end tank 60 is connected by an outlet pipe 31, a filter unit 33 and a manually operable valve 38 to the outlet spigot or faucet 39.

Coiled around the outside of the tank 60 is a tubular cooling coil 41, which as in the first embodiment, has opposite ends thereof connected to a conventional refrigeration unit 42. The tank 60 and its surrounding cooling coil 41 are enclosed in a cylindrical insulating jacket 62, which may be made of any known insulating material capable of minimizing the heat transfer between the tank 60 and the surrounding atmosphere.

As in the first embodiment, the regulator 20 on tank 60 is set to develop a pressure of approximately 5 pounds per square inch in the air space formed in the top of tank 60. Also the regulator 14 is set so that the water entering the tank 60 from the supply line 15 will be at a pressure slightly greater than approximately 5 pounds per square inch; and the output of compressor 23 is, as in the first embodiment, at a pressure of approximately 10 pounds per square inch. Thus, any excess ozone gas fed by the diffuser 29 into the tank 60, will increase the air pressure in the top of the tank until the regulator 20 operates to vent tank 60 until the pressure therein once again falls to or below the limit set by regulator 20. Moreover, when the valve 38 is operated, water will be fed from the combination contact-cooling tank 60 directly to the spigot 39.

To effect periodic operation of the ozone generator 22, a thermostat 65 is mounted in the bottom of tank 60 for operation in response to predetermined temperature changes in the drinking water in the tank. This thermostat contains a switch 66 (FIG. 4), which is connected in series with the motor 42' of the refrigeration unit 42 between wires or lines L10 and L20, which are adapted to be connected to an alternating current power supply through a manually operable ON–OFF switch 50, as in the preceding embodiment. Connected in parallel with the refrigeration motor 42' is a relay CR2, which has its operating coil connected at one side between switch 66 and motor 42', and at its opposite side to line L20. Relay CR2 operates two sets of normally open relay contacts CR2–1 and CR2–2. Contacts CR2–1 are connected in series with the air compressor motor 55; and contacts CR2–2 are connected in series with the primary coil of the transformer 56, which, as in the first embodiment, supplies high voltage to the generator 22.

Assuming that the thermostat 65 is set to maintain the temperature of the drinking water in tank 60 at approximately 40° F., then whenever the temperature of the water surrounding the thermostat rises above approximately 40° F., the switch 66 closes completing the circuit from line L10 through both the motor 42' for the refrigeration unit, and through the operating coil for the relay CR2. Assuming, at this time, that the switch 50 is closed, then both the motor 42' and the relay CR2 will remain energized until the ambient temperature of the water around thermostat 65 falls to approximately 40° F., at which time the switch 66 will then reopen to deenergize motor 42' and the relay CR2. Whenever the relay CR2 is energized, of course, its contacts CR2–1 and CR2–2 will be closed to energize both the compressor motor 55 and the transformer T, so that ozone gas will be fed by the generator 22 to the diffuser 29 in tank 60.

With this construction, whenever the valve 38 is opened, float 17 will drop to admit fresh drinking water from the line 15 to the tank 60. The incoming, unrefrigerated water will tend to elevate the temperature of the water tank 60; and when the temperature of the water increases high enough to trigger or close the switch 66 in the thermostat 65, then both the refrigeration unit 42 and the ozone generator 22 will be actuated simultaneously to purify and cool the water in tank 60. When the water in the tank again reaches, approximately 40° F., the switch 66 will reopen to deenergize motor 42' and relay CR2, thus reopening contacts CR2–1 and CR2–2 to deenergize the ozone generator 22.

If desired, instead of using switch contacts that are instantly responsive to the operating coil of relay CR2, switches CR2–1 and CR2–2 may be of the time-delayed opening variety, so that the generator 22 will remain energized for a predetermined period of time after the operating coil of CR2 and the motor 42' are deenergized by the opening of switch 66. This would assure that each time the refrigeration unit 42 is operated by the thermostat 65, the generator 22 will be actuated for a predetermined minimum period of time, thereby assuring satisfactory purification of the water in tank 60.

From the foregoing it will be apparent that the embodiment of FIGS. 3 and 4 enables simultaneous refrigeration and purification of a quantity of water in a single, pressurized water cooler tank or reservoir 60. Moreover, to assure adequate purification of the water in the tank, the refrigeration unit 42 and the ozone generator 22 have both been made responsive through the thermostat 65 to the temperature of the water in tank 60. Although in the embodiment illustrated in FIG. 3 the thermostat 65 is shown to be positioned adjacent the bottom of the tank 60, it will be understood that the exact disposition of the thermostat within the tank can be varied, if desired. By placing the thermostat adjacent the bottom of the tank, it will be apparent that a greater quantity of water will have to be drained from the tank 60 before the switch 66 will be closed, as compared to the quantities that would have to be drained from the tank were the thermostat 65 to be positioned closer to the inlet line 13, where there is likely to be more rapid fluxuation in the ambient temperature.

Having thus described my invention, what I claim is:

1. A pressurized drinking water purifier and cooler, comprising
   a sealed tank,
   first valve means connecting said tank to a supply of water under pressure, and operative automatically to maintain the water in said tank at a predetermined level spaced beneath the upper end of said tank,
   pressure regulating means on said tank connected to the space in said tank above the level of the water therein, and operative to vent said space to atmosphere, when the pressure in said space exceeds a predetermined value,
   a diffuser mounted in said tank adjacent the lower end thereof,
   means energizable to supply ozone gas to said diffuser at a pressure greater than said predetermined value, whereby said gas is bubbled upwardly through the water in said tank by said diffuser to purify said water,
   second valve means operable to effect withdrawal of water from said tank,
   means interposed between said tank and said second valve means for cooling the purified water, and
   control means operative automatically and periodically to energize said supply means to supply ozone gas under pressure to said diffuser.

2. A pressurized drinking water purifier and cooler as defined in claim 1, wherein said cooling means comprises
   a second tank connected to the first-named tank to receive water therefrom upon operation of said second valve means, and
   a refrigerating coil surrounding said second tank and operatively connected to a refrigeration unit to chill the water in said second tank upon energization of said unit.

3. A pressurized drinking water purifier and cooler as defined in claim 2, wherein said second valve means comprises a manually-operable valve connected to an outlet on said second tank and operable to allow the discharge of water from said second tank under the pressure maintained in said first tank by said regulating means.

4. A pressurized drinking water purifier and cooler as defined in claim 1, wherein
   said cooling means comprises a refrigerating coil surrounding said tank and operatively connected to a refrigeration unit to chill the water in said tank to a predetermined temperature upon energization of said unit, and
   said second valve means comprises a manually-operable valve connected to an outlet in said tank and operable selectively to withdraw water therefrom.

5. A pressurized drinking water purifier and cooler as defined in claim 4, wherein said control means includes means responsive to the temperature of the water in said tank simultaneously to energize said ozone supply means and said refrigeration unit, when the temperature of the water in said tank exceeds said predetermined temperature.

6. A pressurized drinking water purifier and cooler as defined in claim 5, wherein said temperature responsive means includes
   means for deenergizing said refrigeration unit when the temperature of the water in said tank falls below said predetermined temperature, and
   means for maintaining said ozone supply means energized for a predetermined period of time after the deenergization of said refrigeration unit.

7. A pressurized drinking water purifier and cooler, comprising
   a sealed tank,
   first valve means connecting said tank to a supply of water under pressure, and operative automatically to maintain the water in said tank at a predetermined level spaced beneath the upper end of said tank,
   a pressure regulator connected to the top of said tank to vent the space therein above the level of the water in said tank, when the pressure in said space exceeds a predetermined value,
   a manually operable valve connected to an outlet in said tank adjacent the lower end thereof, and operable to draw water from said tank at said predetermined pressure,
   an ozone generator disposed exteriorly of said tank,
   a diffuser mounted in said tank adjacent said lower end thereof and connected to the output of said generator to receive ozone gas therefrom,
   a refrigeration unit mounted exteriorly of said tank,
   a refrigerating coil surrounding said tank and connected to said unit to cool the water in said tank to a predetermined temperature upon operation of said unit, and
   electrical control means connected to said generator and said unit and operative periodically to energize both said generator and refrigeration unit.

8. A pressurized drinking water purifier and cooler as defined in claim 7, wherein said control means includes means responsive to predetermined changes in the temperature of the water in said tank momentarily to energize both said generator and unit at the same time.

9. A pressurized drinking water purifier and cooler as defined in claim 8, wherein the last-named means includes means for maintaining said generator energized for a predetermined period of time following the deenergization of said refrigeration unit.

* * * * *